(12) United States Patent
Miskin

(10) Patent No.: US 10,051,703 B2
(45) Date of Patent: Aug. 14, 2018

(54) LED LIGHTING SYSTEM

(71) Applicant: Lynk Labs, Inc., Elgin, IL (US)

(72) Inventor: Michael Miskin, Sleepy Hollow, IL (US)

(73) Assignee: Lynk Labs, Inc., Elgin, IL (US)

( * ) Notice: Subject to any disclaimer, the term of this patent is extended or adjusted under 35 U.S.C. 154(b) by 0 days.

(21) Appl. No.: 15/477,702

(22) Filed: Apr. 3, 2017

(65) Prior Publication Data
US 2017/0273154 A1     Sep. 21, 2017

Related U.S. Application Data

(60) Continuation of application No. 14/948,635, filed on Nov. 23, 2015, now Pat. No. 9,615,420, which is a division of application No. 13/697,646, filed as application No. PCT/US2011/036359 on May 12, 2011, now Pat. No. 9,198,237, which is a continuation-in-part of application No. PCT/US2010/062235, filed on Dec. 28, 2010, which is a continuation-in-part of application No. 12/287,267, filed on Oct. 6, 2008, now Pat. No.
(Continued)

(51) Int. Cl.
*H05B 33/00* (2006.01)
*H05B 33/08* (2006.01)

(52) U.S. Cl.
CPC ..... *H05B 33/0845* (2013.01); *H05B 33/0815* (2013.01)

(58) Field of Classification Search
CPC ............ H05B 33/0815; H05B 33/0845; H05B 33/0806; H05B 33/0821; H05B 33/0887; H05B 37/0227; H05B 33/0854; H05B 33/0857; H05B 33/0809; H05B 33/0872; H05B 33/0884; H05B 37/0245; H05B 37/0218; H05B 37/0254; H05B 33/0827; H05B 37/02; H05B 33/083; H05B 33/0851; H05B 33/00
See application file for complete search history.

(56) References Cited

U.S. PATENT DOCUMENTS 3,869,641 A     5/1975  Goldberg
4,218,627 A     8/1980  Kiesel
(Continued)

FOREIGN PATENT DOCUMENTS

EP     1 215 944     6/2002
JP     08-137429     5/1996
(Continued)

OTHER PUBLICATIONS

International Search Report for International Application PCT/US2011/036359 dated May 12, 2011, 10 pages.

*Primary Examiner* — Monica C King
(74) *Attorney, Agent, or Firm* — Haynes and Boone, LLP

(57) ABSTRACT

An LED lighting system having at least one LED circuit and at least two circuits or drivers capable of receiving an AC voltage at a first frequency and having an output capable of driving the at least one LED circuit, wherein the output of each circuit or driver capable of driving the at least one LED circuit is provided to the at least one LED circuit through a circuit or sensor capable of permitting only a single output from the at least two circuits or drivers be provided to the at least one LED circuit.

4 Claims, 14 Drawing Sheets

Related U.S. Application Data 8,179,055, and a continuation-in-part of application No. 12/364,890, filed on Feb. 3, 2009, now Pat. No. 8,148,905, which is a continuation of application No. 11/066,414, filed on Feb. 25, 2005, now Pat. No. 7,489,086, said application No. PCT/US2010/062235 is a continuation-in-part of application No. PCT/US2010/001597, filed on May 28, 2010, which is a continuation-in-part of application No. 12/287,267, filed on Oct. 6, 2008, now Pat. No. 8,179,055, said application No. PCT/US2010/062235 is a continuation-in-part of application No. PCT/US2010/001269, filed on Apr. 30, 2010, which is a continuation-in-part of application No. 12/287,267, filed on Oct. 6, 2008, now Pat. No. 8,179,055.

(60) Provisional application No. 61/333,963, filed on May 12, 2010, provisional application No. 61/284,927, filed on Dec. 28, 2009, provisional application No. 61/335,069, filed on Dec. 31, 2009, provisional application No. 60/997,771, filed on Oct. 6, 2007, provisional application No. 60/547,653, filed on Feb. 25, 2004, provisional application No. 60/559,867, filed on Apr. 6, 2004, provisional application No. 61/217,215, filed on May 28, 2009, provisional application No. 61/215,144, filed on May 1, 2009.

(56) References Cited

U.S. PATENT DOCUMENTS

| | | | |
|---|---|---|---|
| 4,298,869 | A | 11/1981 | Okuno |
| 5,683,436 | A | 11/1997 | Mendes et al. |
| 5,699,218 | A | 12/1997 | Kadah |
| 5,790,013 | A | 8/1998 | Hauck |
| 6,107,744 | A | 8/2000 | Bavaro et al. |
| 6,614,103 | B1 | 9/2003 | Durocher et al. |
| 6,781,570 | B1 | 8/2004 | Arrigo et al. |
| 6,884,973 | B2 | 4/2005 | Castracane |
| 7,489,086 | B2 | 2/2009 | Miskin et al. |
| 7,859,196 | B2 | 12/2010 | Lee et al. |
| 8,148,905 | B2 | 4/2012 | Miskin et al. |
| 8,179,055 | B2 | 5/2012 | Miskin et al. |
| 9,615,420 | B2 * | 4/2017 | Miskin ............... H05B 33/0845 |
| 2003/0043611 | A1 | 3/2003 | Bockle et al. |
| 2003/0122502 | A1 | 7/2003 | Clauberg et al. |
| 2003/0169014 | A1 | 9/2003 | Kadah |
| 2003/0175004 | A1 | 9/2003 | Garito et al. |
| 2004/0080941 | A1 | 4/2004 | Jiang et al. |
| 2004/0183380 | A1 | 9/2004 | Otake |
| 2004/0189218 | A1 | 9/2004 | Leong et al. |
| 2004/0201988 | A1 | 10/2004 | Allen |
| 2005/0093461 | A1 | 5/2005 | Cull et al. |
| 2005/0110426 | A1 | 5/2005 | Shao |
| 2005/0162096 | A1 | 7/2005 | Bertrand |
| 2005/0173990 | A1 | 8/2005 | Andersen et al. |
| 2005/0218838 | A1 | 10/2005 | Lys |
| 2006/0038542 | A1 | 2/2006 | Park et al. |
| 2006/0103913 | A1 | 5/2006 | Handschy et al. |
| 2006/0138971 | A1 | 6/2006 | Uang et al. |
| 2006/0158130 | A1 | 7/2006 | Farrukawa |
| 2007/0069663 | A1 | 3/2007 | Burdalski et al. |
| 2007/0228999 | A1 | 10/2007 | Kit |
| 2007/0273299 | A1 | 11/2007 | Miskin et al. |
| 2008/0116816 | A1 | 5/2008 | Neuman et al. |
| 2008/0136347 | A1 | 6/2008 | Lin et al. |
| 2008/0158915 | A1 | 7/2008 | Williams |
| 2008/0203405 | A1 | 8/2008 | Rooymans |
| 2008/0203936 | A1 | 8/2008 | Mariyama et al. |
| 2008/0211421 | A1 | 9/2008 | Lee et al. |
| 2008/0218098 | A1 | 9/2008 | Lee et al. |
| 2009/0021185 | A1 | 1/2009 | Ng |
| 2009/0295300 | A1 | 12/2009 | King |
| 2010/0039794 | A1 | 2/2010 | Ghanem et al. |
| 2010/0207536 | A1 | 8/2010 | Burdalski et al. |
| 2011/0210670 | A1 | 9/2011 | Sauerlander et al. |
| 2012/0043897 | A1 | 2/2012 | Miskin et al. |
| 2012/0069560 | A1 | 3/2012 | Miskin et al. |
| 2012/0242239 | A1 | 9/2012 | Miskin et al. |
| 2012/0268008 | A1 | 10/2012 | Miskin et al. |
| 2012/0293083 | A1 | 11/2012 | Miskin et al. |

FOREIGN PATENT DOCUMENTS

| | | |
|---|---|---|
| JP | 11-016683 | 1/1999 |
| JP | 11-330561 | 11/1999 |
| WO | WO 2008124701 | 10/2008 |

* cited by examiner

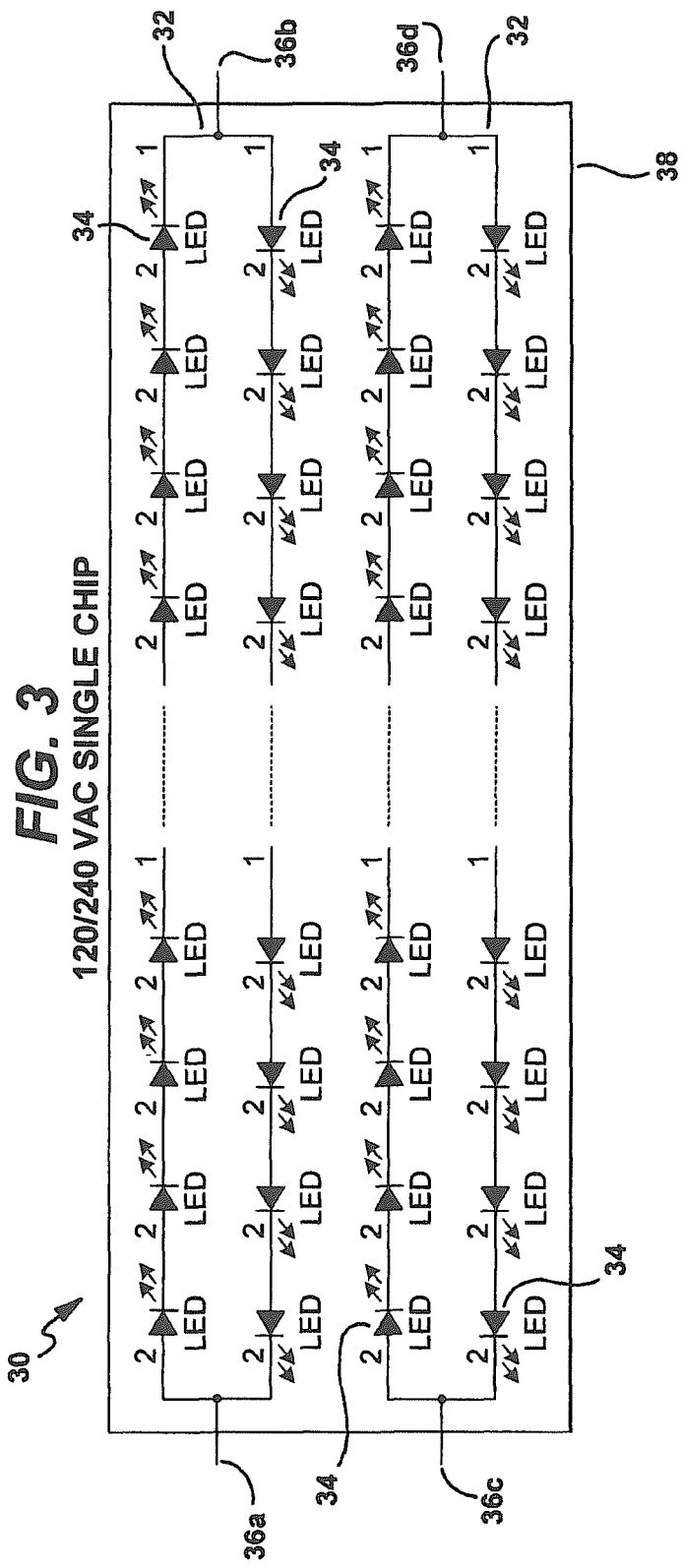

2-WAY SINGLE CHIP
AC LED FOR 2-WAY LAMP

2-WAY SINGLE CHIP 12V
AC LED FOR 2-WAY LAMP

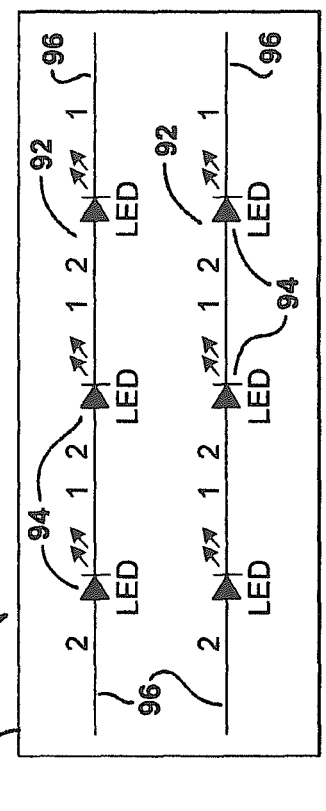
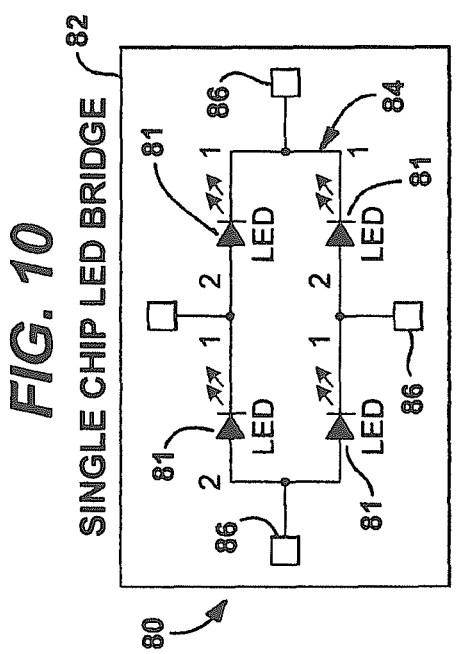
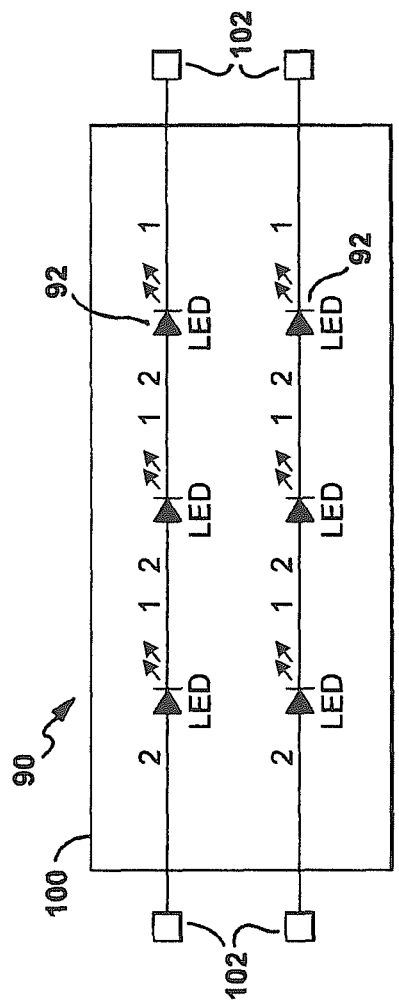

LED LIGHTING SYSTEM

RELATED APPLICATIONS

The present application is a continuation of U.S. patent application Ser. No. 14/948,635 filed Nov. 23, 2015 which is a divisional application of U.S. patent application Ser. No. 13/697,646 filed Nov. 13, 2012 which is a 371 National Phase Application of International Application No. PCT/US2011/0363359 filed May 12, 2011 which claims priority to U.S. Provisional Application No. 61/333,963 filed May 12, 2010 and is a continuation-in-part of International Application No. PCT/US2010/062235 filed Dec. 28, 2010 which claims priority to U.S. Provisional Application No. 61/284,927 filed Dec. 28, 2009 and U.S. Provisional Application No. 61/335,069 filed Dec. 31, 2009 and is a continuation-in-part of U.S. patent application Ser. No. 12/287,267, filed Oct. 6, 2008, which claims priority to U.S. Provisional Application No. 60/997,771, filed Oct. 6, 2007; U.S. patent application Ser. No. 12/364,890 filed Feb. 3, 2009 which is a continuation of U.S. application Ser. No. 11/066,414 (now U.S. Pat. No. 7,489,086) filed Feb. 25, 2005 which claims priority to U.S. Provisional Application No. 60/547,653 filed Feb. 25, 2004 and U.S. Provisional Application No. 60/559,867 filed Apr. 6, 2004; International Application No. PCT/US2010/001597 filed May 28, 2010 which is a continuation-in-part of U.S. application Ser. No. 12/287,267, and claims priority to U.S. Provisional Application No. 61/217,215, filed May 28, 2009; International Application No. PCT/US2010/001269 filed Apr. 30, 2010 which is a continuation-in-part of U.S. application Ser. No. 12/287,267, and claims priority to U.S. Provisional Application No. 61/215,144, filed May 1, 2009; the contents of each of these applications are expressly incorporated herein by reference.

TECHNICAL FIELD

The present invention relates to an LED lighting system having multiple circuits or drivers capable of providing an output to at least one LED circuit.

FEDERALLY SPONSORED RESEARCH OR DEVELOPMENT

None.

BACKGROUND OF THE INVENTION

Description of the Related Art

LEDs are semiconductor devices that produce light when a current is supplied to them. LEDs are intrinsically DC devices that only pass current in one polarity and historically have been driven by DC voltage sources using resistors, current regulators and voltage regulators to limit the voltage and current delivered to the LED. Some LEDs have resistors built into the LED package providing a higher voltage LED typically driven with 5V DC or 12V DC.

Some standard AC voltages in the world include 12 VAC, 24 VAC, 100 VAC, 110 VAC, 120 VAC, 220 VAC, 230 VAC, 240 VAC and 277 VAC. Therefore, it would be advantageous to have a single chip LED or multi-chip single LED packages and/or devices that could be easily configured to operate at multiple voltage levels and/or multiple brightness levels by simply selecting a voltage and/or current level when packaging the multi-voltage and/or multi-current single chip LEDs or by selecting a specific voltage and/or current level when integrating the LED package onto a printed circuit board or within a finished lighting product. It would also be advantageous to have multi-current LED chips and/or packages for LED lamp applications in order to provide a means of increasing brightness in LED lamps by switching in additional circuits just as additional filaments are switched in for standard incandescent lamps.

U.S. Pat. No. 7,525,248 discloses a chip-scale LED lamp including discrete LEDs capable of being built upon electrically insulative, electrically conductive, or electrically semi conductive substrates. Further, the construction of the LED lamp enables the lamp to be configured for high voltage AC or DC power operation. The LED based solid-state light emitting device or lamp is built upon an electrically insulating layer that has been formed onto a support surface of a substrate. Specifically, the insulating layer may be epitaxially grown onto the substrate, followed by an LED buildup of an n-type semiconductor layer, an optically active layer, and a p-type semiconductor layer, in succession. Isolated mesa structure of individual, discrete LEDs are formed by etching specific portions of the LED buildup down to the insulating layer, thereby forming trenches between adjacent LEDs. Thereafter, the individual LEDs are electrically coupled together through conductive elements or traces being deposited for connecting the n-type layer of one LED and the p-type layer of an adjacent LED, continuing across all of the LEDs to form the solid-state light emitting device. The device may therefore be formed as an integrated AC/DC light emitter with a positive and negative lead for supplied electrical power. For instance, the LED lamp may be configured for powering by high voltage DC power (e.g., 12V, 24V, etc.) or high voltage AC power (e.g., 110/120V, 220/240V, etc.).

U.S. Pat. No. 7,213,942 discloses a single-chip LED device through the use of integrated circuit technology, which can be used for standard high AC voltage (110 volts for North America, and 220 volts for Europe, Asia, etc.) operation. The single-chip AC LED device integrates many smaller LEDs, which are connected in series. The integration is done during the LED fabrication process and the final product is a single-chip device that can be plugged directly into house or building power outlets or directly screwed into incandescent lamp sockets that are powered by standard AC voltages. The series connected smaller LEDs are patterned by photolithography, etching (such as plasma dry etching), and metallization on a single chip. The electrical insulation between small LEDs within a single-chip is achieved by etching light emitting materials into the insulating substrate so that no light emitting material is present between small LEDs. The voltage crossing each one of the small LEDs is about the same as that in a conventional DC operating LED fabricated from the same type of material (e.g., about 3.5 volts for blue LEDs).

Accordingly, single chip LEDs have been limited and have not been integrated circuits beyond being fixed series, fixed parallel or series parallel circuit configurations until the development of AC LEDs. The AC LEDs have still however been single circuit or parallel circuit fixed single voltage designs.

LED packages have historically not been integrated circuits beyond being fixed series, fixed parallel or fixed series parallel LED circuit configurations.

The art is deficient in that it does not provide a multi-voltage and/or multi-current circuit monolithically integrated on a single substrate which would be advantageous.

It would further be advantageous to have a multi-voltage and/or multi-brightness circuit that can provide options in voltage level, brightness level and/or AC or DC powering input power preference.

It would further be advantageous to provide multiple voltage level and/or multiple brightness level light emitting LED circuits, chips, packages and lamps "multi-voltage and/or multi-brightness LED devices" that can easily be electrically configured for at least two forward voltage drive levels with direct AC voltage coupling, bridge rectified AC voltage coupling or constant voltage DC power source coupling. For example, it would be advantageous to provide a device that can be driven with more than one AC or DC forward voltage "multi-voltage" at 6V or greater based on a selectable desired operating voltage level that is achieved by electrically connecting the LED circuits in a series or parallel circuit configuration and/or more than one level of brightness "multi-brightness" based on a switching means that connects and/or disconnects at least one additional LED circuit to and/or from a first LED circuit. It would be advantageous if the desired operating voltage level and/or the desired brightness level electrical connection was achieved and/or completed at the LED packaging level when the multi-voltage and/or multi-brightness circuits and/or single chips are integrated into the LED package, or the LED package may have external electrical contacts that match the integrated multi-voltage and/or multi-brightness circuits and/or single chips within, allowing the drive voltage level and/or the brightness level select-ability to be passed on through to the exterior of the LED package and allowing the voltage level or brightness level to be selected at the LED package user, or the PCB assembly facility, or the end product manufacturer.

It would further be advantageous to provide at least two integrated circuits having a forward voltage of at least 12 VAC or 12 VDC or greater on a single chip or within a single LED package that provide a means of selecting a forward voltage when packaging a multi-voltage and/or multi-brightness circuit using discrete die (one LED chip at a time) and wire bonding them into a circuit at the packaging level or when packaging one or more multi-voltage and/or multi-brightness level single chips within a LED package.

It would further be advantageous to provide multi-voltage and/or multi-brightness level devices that can provide electrical connection options for either AC or DC voltage operation at preset forward voltage levels of 6V or greater.

It would further be advantageous to provide multi-brightness LED devices that can be switched to different levels of brightness by simply switching additional circuits on or off in addition to a first operating circuit within a single chip and or LED package. This would allow LED lamps to switch to higher brightness levels just like 2-way or 3-way incandescent lamps do today.

The benefits of providing multi-voltage circuits of 6V or greater on a single chip is that an LED packager can use this single chip as a platform to offer more than one LED packaged product with a single chip that addresses multiple voltage levels for various end customer design requirements. This would also increase production on a single product for the chip maker and improves inventory control. This also improves buying power and inventory control for the LED packager when using one chip.

It would further be advantageous to have a LED lighting assembly which includes LED circuitry for AC or DC drive and a high frequency AC voltage transformer or inverter that could be used to convert low frequency voltages, like for example mains voltage or some other low voltage at 50/60 Hz, to a high frequency without a change in the voltage provided. For example, it would be advantageous to have a LED lighting power supply and/or driver capable of receiving 120 VAC at 60 Hz and be able to provide a high frequency AC output directly to an AC driven LED circuit(s), or alternatively to a DC driven LED circuit(s) through an AC-to-DC rectifier at a voltage equal to or different from the original input voltage to the power supply and/or driver.

It would be further advantageous to combine multiple-voltage LED chips, packages, circuits, lamps, etc., high frequency AC voltage power supplies and/or transformers to drive LEDs by either directly connecting a high frequency transformer or inverter to an AC driven LED circuit(s), or by operably connecting an AC-to-DC rectifier between the high frequency transformer or inverter and a DC driven LED circuit. With proper design considerations LEDs may be driven more efficiently with direct AC or rectified AC than with constant voltage or constant current DC drive schemes. High frequency AC transformers or inverters can be made smaller and more cost effective than constant current or constant voltage DC drivers or power supplies currently being used to power LEDs. The higher the frequency, the smaller the transformer can be made. With proper design consideration and based on the wattage and the frequency of the AC voltage output of the power supply, a high frequency AC voltage transformer can be made small enough to be mounted directly onto a LED lighting PCB assembly.

It would be further advantageous to provide an LED lighting system capable of operating after a circuit or driver through which power is supplied to LEDs fails.

The present invention provides for these advantages and solves the deficiencies in the art.

SUMMARY OF THE INVENTION

According to one aspect of the invention at least two single voltage AC LED circuits are formed on a single chip or on a substrate providing a multi-voltage AC LED device for direct AC power operation. Each single voltage AC LED circuit has at least two LEDs connected to each other in opposing parallel relation.

According to another aspect of the invention, each single voltage AC LED circuit is designed to be driven with a predetermined forward voltage of at least 6 VAC and preferably each single voltage AC LED circuit has a matching forward voltage of 6 VAC, 12 VAC, 24 VAC, 120 VAC, or other AC voltage levels for each single voltage AC LED circuit.

According to another aspect of the invention, each multi-voltage AC LED device would be able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. By way of example, the second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention, at least two single voltage series LED circuits, each of which have at least two serially connected LEDs, are formed on a single chip or on a substrate providing a multi-voltage AC or DC operable LED device.

According to another aspect of the invention, each single voltage series LED circuit is designed to be driven with a predetermined forward voltage of at least 6V AC or DC and preferably each single voltage series LED circuit has a matching forward voltage of 6V, 12V, 24V, 120V, or other AC or DC voltage levels. By way of example, each multi-voltage AC or DC LED device would be able to be driven with at least two different AC or DC forward voltages resulting in a first forward voltage drive level by electrically connecting the two single voltage series LED circuits in parallel and a second forward voltage drive level by electrically connecting the at least two single voltage level series LED circuits in series. The second forward voltage drive level of the serially connected series LED circuits would be approximately twice the level of the first forward voltage drive level of the parallel connected series LED circuits. The at least two parallel connected series LED circuits would be twice the current of the at least two serially connected series LED circuits. In either circuit configuration, the brightness would be approximately the same with either forward voltage drive selection of the multi-voltage series LED device.

According to another aspect of the invention, at least two single voltage AC LED circuits are formed on a single chip or on a substrate providing a multi-voltage and/or multi-brightness AC LED device for direct AC power operation.

According to another aspect of the invention, each single voltage AC LED circuit has at least two LEDs connected to each other in opposing parallel relation. Each single voltage AC LED circuit is designed to be driven with a predetermined forward voltage of at least 6 VAC and preferably each single voltage AC LED circuit has a matching forward voltage of 6 VAC, 12 VAC, 24 VAC, 120 VAC, or other AC voltage levels for each single voltage AC LED circuit. The at least two AC LED circuits within each multi-voltage and/or multi current AC LED device would be able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. The second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention at least two single voltage LED circuits are formed on a single chip or on a substrate, and at least one bridge circuit made of LEDs is formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VAC, 24 VAC, 120 VAC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate, and at least one bridge circuit made of standard diodes, LEDs or some combination thereof is provided separate of the LED circuit or formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention a multi-voltage and/or multi-current AC LED circuit is integrated within a single chip LED. Each multi-voltage and/or multi-current single chip AC LED comprises at least two single voltage AC LED circuits. Each single voltage AC LED circuit has at least two LEDs in anti-parallel configuration to accommodate direct AC voltage operation. Each single voltage AC LED circuit may have may have at least one voltage input electrical contact at each opposing end of the circuit or the at least two single voltage AC LED circuits may be electrically connected together in series on the single chip and have at least one voltage input electrical contact at each opposing end of the two series connected single voltage AC LED circuits and one voltage input electrical contact at the center junction of the at least two single voltage AC LED circuits connected in series. The at least two single voltage AC LED circuits are integrated within a single chip to form a multi-voltage and/or multi-current single chip AC LED.

According to another aspect of the invention, at least one multi-voltage and/or multi-brightness LED devices may be integrated within a LED lamp. The at least two individual LED circuits within the multi-voltage and/or multi-brightness LED device(s) may be wired in a series or parallel circuit configuration by the LED packager during the LED packaging process thus providing for at least two forward voltage drive options, for example 12 VAC and 24 VAC or 120 VAC and 240 VAC that can be selected by the LED packager.

According to another aspect of the invention a multi-voltage and/or multi-current AC LED package is provided, comprising at least one multi-voltage and/or multi-current single chip AC LED integrated within a LED package. The multi-voltage and/or multi-current AC LED package provides matching electrical connectivity pads on the exterior of the LED package to the electrical connectivity pads of the at least one multi-voltage and/or multi-current single chip AC LED integrated within the LED package thus allowing the LED package user to wire the multi-voltage and/or multi-current AC LED package into a series or parallel circuit configuration during the PCB assembly process or final product integration process and further providing a AC LED package with at least two forward voltage drive options.

According to another aspect of the invention multiple individual discrete LED chips are used to form at least one multi-voltage and/or multi-current AC LED circuit within a LED package thus providing a multi-voltage and/or multi current AC LED package. Each multi-voltage and/or multi-current AC LED circuit within the package comprises at least two single voltage AC LED circuits. Each single voltage AC LED circuit has at least two LEDs in anti-parallel configuration to accommodate direct AC voltage operation The LED package provides electrical connectivity pads on the exterior of the LED package that match the electrical connectivity pads of the at least two single voltage AC LED circuits integrated within the multi-voltage and/or multi-current AC LED package thus allowing the LED package to be wired into a series or parallel circuit configuration during the PCB assembly process and further providing a LED package with at least two forward voltage drive options.

According to another aspect of the invention a multi-voltage and/or multi-current single chip AC LED and/or multi-voltage and/or multi current AC LED package is integrated within an LED lamp. The LED lamp having a structure that comprises a heat sink, a lens cover and a standard lamp electrical base. The multi-voltage and/or multi-current single chip AC LED and/or package is configured to provide a means of switching on at least one additional single voltage AC LED circuit within multi-voltage and/or multi-current AC LED circuit to provide increased brightness from the LED lamp.

According to anther broad aspect of the invention at least one multi-current AC LED single chip is integrated within a LED package.

According to another aspect of the invention, at least one single chip multi-current bridge circuit having standard diodes, LEDs, or some combination thereof is integrated within a LED lamp having a standard lamp base. The single chip multi-current bridge circuit may be electrically connected together in parallel configuration but left open to accommodate switching on a switch to the more than one on the single chip and have at least one accessible electrical contact at each opposing end of the two series connected circuits and one accessible electrical contact at the center junction of the at least two individual serially connected LED circuits. The at least two individual circuits are integrated within a single chip.

According to another aspect of the invention when the at least two circuits are left unconnected on the single chip and provide electrical pads for connectivity during the packaging process, the LED packager may wire them into series or parallel connection based on the desired voltage level specification of the end LED package product offering.

According to another aspect of the invention, a high frequency transformer or inverter may provide power to at least one multi-voltage and/or multi-brightness LED device or chip. The high frequency transformer or inverter may be either packaged with the LED device or chip and may provide direct AC voltage to the LED device or chip, or as a separate driver or power supply for the LED device or chip capable of being electrically connected to the LED device or chip. The high frequency transformer or inverter is designed to receive a voltage at a low frequency, like for example a voltage at 50/60 Hz like a mains voltage, and output a voltage at a high frequency. The high frequency transformer or inverter may also be configured to step-up or step-down the voltage provided to the transformer or inverter from a source voltage.

According to another aspect of the invention, a high-frequency transformer or inverter may provide power to a DC driven-LED circuit, chip, or device or an LED circuit, chip or device containing one or more series strings of LEDs through a rectifier having standard diodes, LEDs, or some combination thereof may be electrically connected between the high-frequency transformer or inverter and. The rectifier may be provided independently from the high-frequency transformer or inverter and the LED circuit, chip, or device and electrically connected at its input to the high-frequency transformer or inverter and at its output to the LED circuit, chip or device. Alternatively, the rectifier may be packaged with the high-frequency transformer or inverter forming a power supply or driver for the LED circuit, chip, or device. The rectifier may likewise be packaged directly with, or as part of, an LED circuit, chip, or device. As should be appreciated by those having skill in the art, packaging the rectifier directly with the LED circuit, chip, or device allows for an LED package containing a DC-driven LED circuit, chip, or device, or one or more series strings of LEDs, to be directly plugged into any power supply or driver providing an AC voltage output and operate. As a further alternative, a high-frequency inverter, rectifier, and LED circuit, chip, or device may be packaged into a single lighting device capable of being directly incorporated into a lighting element, or may be incorporated directly into a lamp or other OEM product utilizing LED light.

According to another aspect of the invention, a two-way or three-way switch may be provided directly between a high-frequency inverter providing power to a LED circuits, chip, or device and the LED circuits, chip or device, or in the alternative between a LED circuits, chip, or device and a rectifier having standard diodes, LEDs, or some combination thereof electrically connected to a high-frequency transformer or inverter.

According to another aspect of the invention, an LED lighting system having multiple circuits or drivers capable of receiving an AC voltage input at a first frequency, like for example a mains input, and providing an output capable of driving at least one LED circuit is provided. The LED lighting system includes a sensor capable of sensing the output of each circuit or driver capable of driving the LED circuit, and permitting only a single output to be provided. The sensor may be further capable of switching between circuits or drivers capable of driving the LED circuit if any circuit or driver currently being utilized fails.

Other aspects and features of the invention will become apparent to those having ordinary skill in the art upon review of the following Description, Claims, and associated Drawings.

BRIEF DESCRIPTION OF THE DRAWINGS

FIG. 3 shows a schematic view of a preferred embodiment of the invention;

FIG. 10 shows a schematic view of a preferred embodiment of the invention;

FIG. 11 shows a schematic view of a preferred embodiment of the invention;

FIG. 12 shows a schematic view of a preferred embodiment of the invention;

DETAILED DESCRIPTION OF PREFERRED EMBODIMENTS

Figure 2:
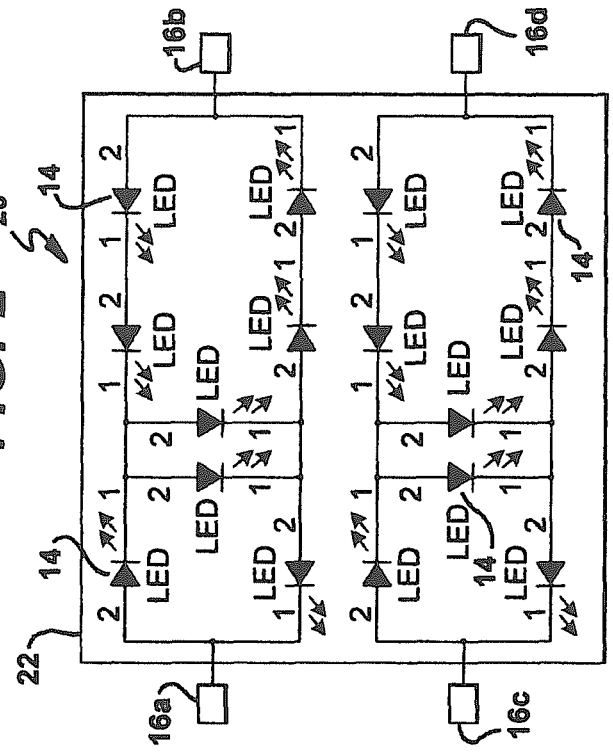
FIG. 2 shows a schematic view of a preferred embodiment of the invention.

While the present invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
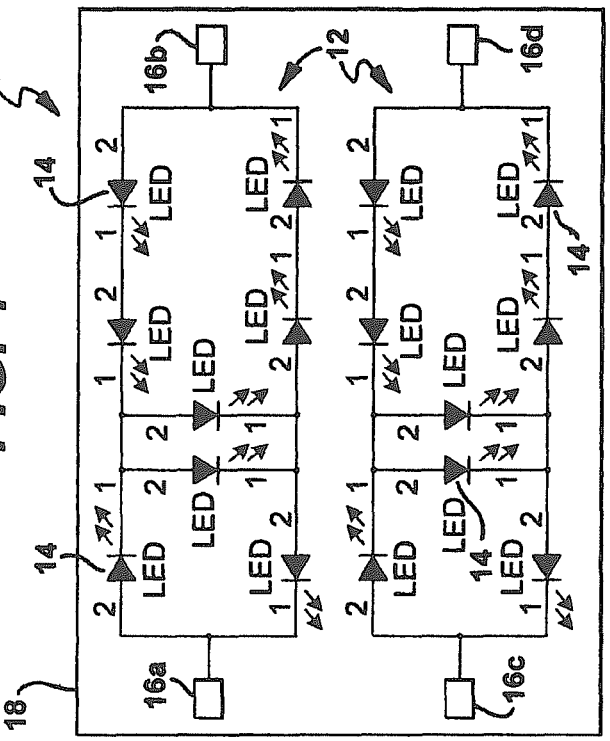
FIG. 1 shows a schematic view of a preferred embodiment of the invention.

FIG. 1 discloses a schematic diagram of a multi-voltage and/or multi-brightness LED lighting device 10. The multi-voltage and/or multi-brightness LED lighting device 10 comprises at least two AC LED circuits 12 configured in an imbalanced bridge circuit, each of which have at least two LEDs 14. The at least two AC LED circuits have electrical contacts 16a, 16b, 16c, and 16d at opposing ends to provide various connectivity options for an AC voltage source input. For example, if 16a and 16c are electrically connected together and 16b and 16d are electrically connected together and one side of the AC voltage input is applied to 16a and 16c and the other side of the AC voltage input is applied to 16b and 16d, the circuit becomes a parallel circuit with a first operating forward voltage. If only 16a and 16c are electrically connected and the AC voltage inputs are applied to electrical contacts 16b and 16d, a second operating forward voltage is required to drive the single chip 18. The single chip 18 may also be configured to operate at more than one brightness level "multi-brightness" by electrically connecting for example 16a and 16b and applying one side of the line of an AC voltage source to 16a ad 16b and individually applying the other side of the line from the AC voltage source a second voltage to 26b and 26c.

FIG. 2 discloses a schematic diagram of a multi-voltage and/or multi-brightness LED lighting device 20 similar to the multi-voltage and/or multi-brightness LED lighting device 10 described above in FIG. 1. The at least two AC LED circuits 12 are integrated onto a substrate 22. The at least two AC LED circuits 12 configured in a imbalanced bridge circuit, each of which have at least two LEDs 14. The at least two AC LED circuits have electrical contacts 16a, 16b, 16c, and 16d on the exterior of the substrate 22 and can be used to electrically configure and/or control the operating voltage and/or brightness level of the multi-voltage and/or multi-brightness LED lighting device.

FIG. 3 discloses a schematic diagram of a multi-voltage and/or multi-brightness LED lighting device 30 similar to the multi-voltage and/or multi-brightness LED lighting device 10 and 20 described in FIGS. 1 and 2. The multi-voltage and/or multi-brightness LED lighting device 30 comprises at least two AC LED circuits 32 having at least two LEDs 34 connected in series and anti-parallel configuration. The at least two AC LED circuits 32 have electrical contacts 36a, 36b, 36c, and 36d at opposing ends to provide various connectivity options for an AC voltage source input. For example, if 36a and 36c are electrically connected together and 36b and 36d are electrically connected together and one side of the AC voltage input is applied to 36a and 36c and the other side of the AC voltage input is applied to 36b and 36d, the circuit becomes a parallel circuit with a first operating forward voltage. If only 36a and 36c are electrically connected and the AC voltage inputs are applied to electrical contacts 36b and 36d, a second operating forward voltage is required to drive the multi-voltage and/or multi-brightness lighting device 30. The multi-voltage and/or multi-brightness lighting device 30 may be a monolithically integrated single chip 38, a monolithically integrated single chip integrated within a LED package 38 or a number of individual discrete die integrated onto a substrate 38 to form a multi-voltage and/or multi-brightness lighting device 30.

Figure 4:
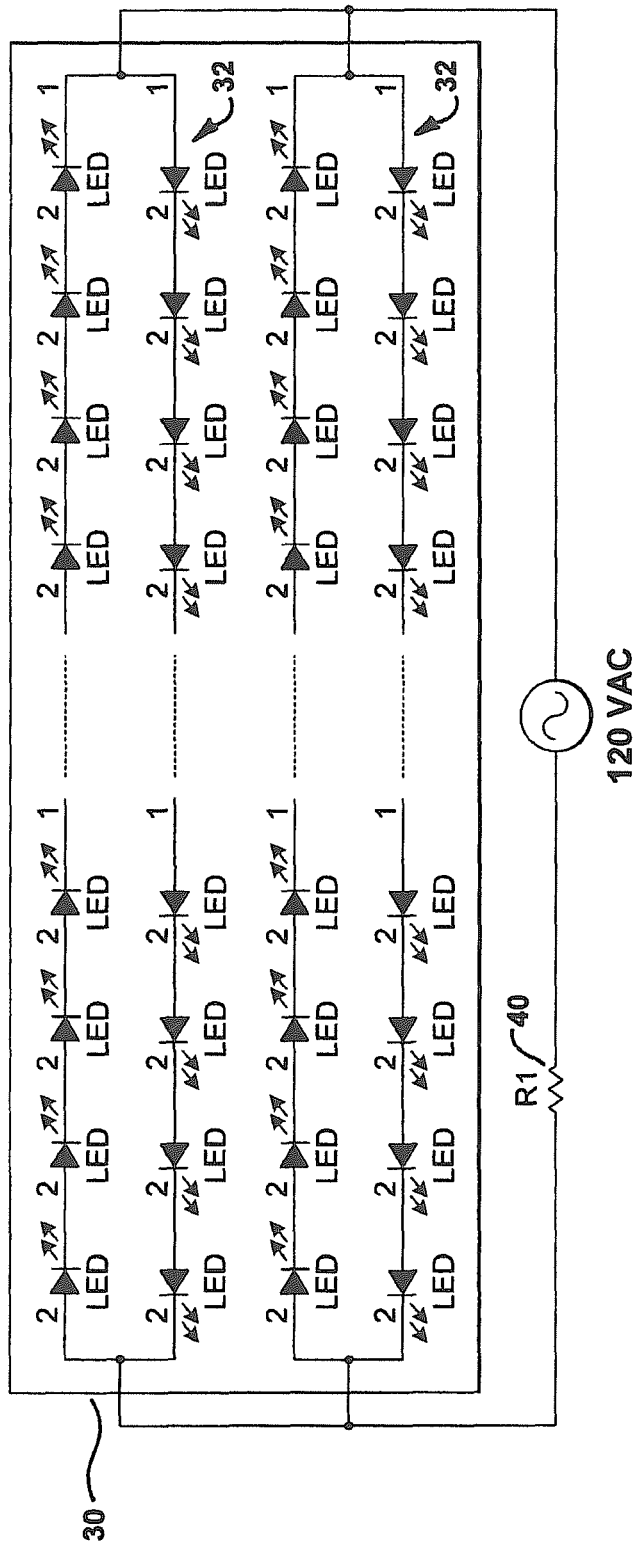
FIG. 4 shows a schematic view of a preferred embodiment of the invention.

FIG. 4 discloses a schematic diagram of the same multi-voltage and/or multi-brightness LED device 30 as described in FIG. 3 having the at least two AC LED circuits 32 connected in parallel configuration to an AC voltage source and operating at a first forward voltage. A resistor 40 may be used to limit current to the multi-voltage and/or multi-brightness LED lighting device 30.

Figure 5:
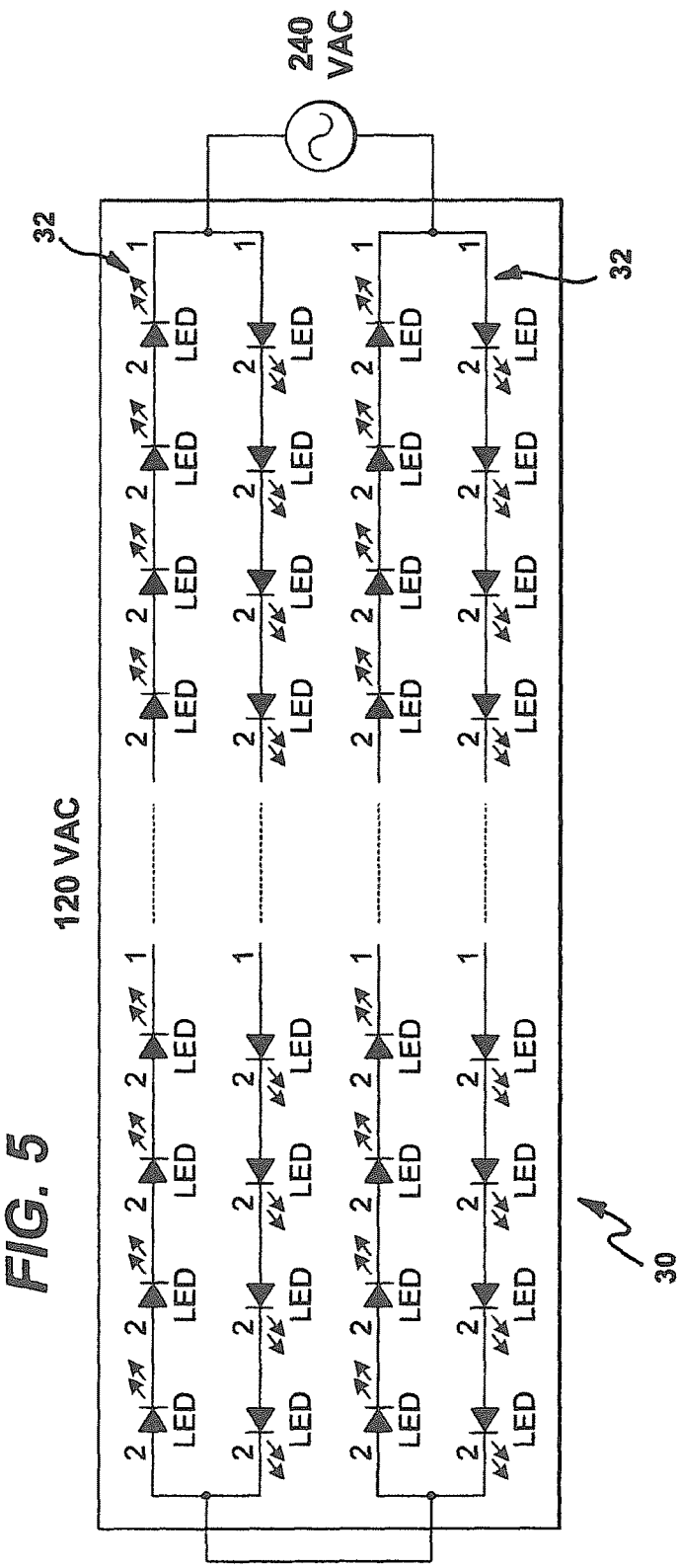
FIG. 5 shows a schematic view of a preferred embodiment of the invention.

FIG. 5 discloses a schematic diagram of the same multi-voltage and/or multi-brightness LED device 30 as described in FIG. 3 having the at least two AC LED circuits 32 connected in series configuration to an AC voltage source and operating at a second forward voltage that is approximately two times greater than the first forward voltage of the parallel circuit as described in FIG. 4. A resistor may be used to limit current to the multi-voltage and/or multi-brightness LED lighting device.

Figure 6B:
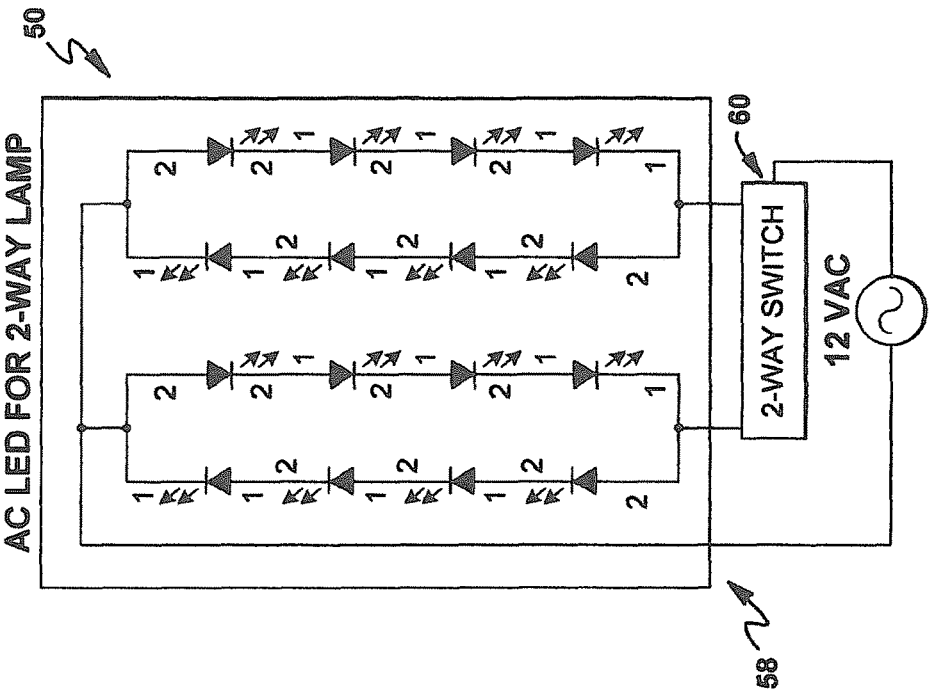
FIG. 6b shows a schematic view of a preferred embodiment of the invention.
Figure 6A:
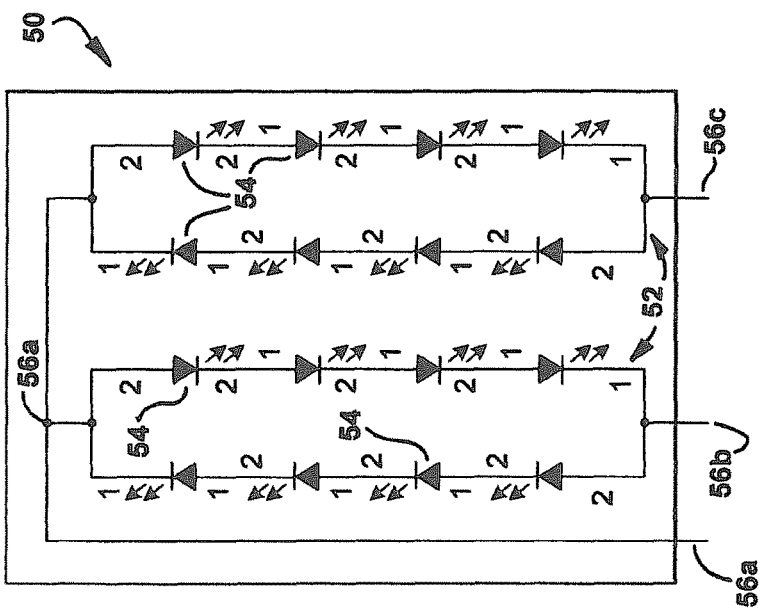
FIG. 6a shows a schematic view of a preferred embodiment of the invention.
Figure 7A:
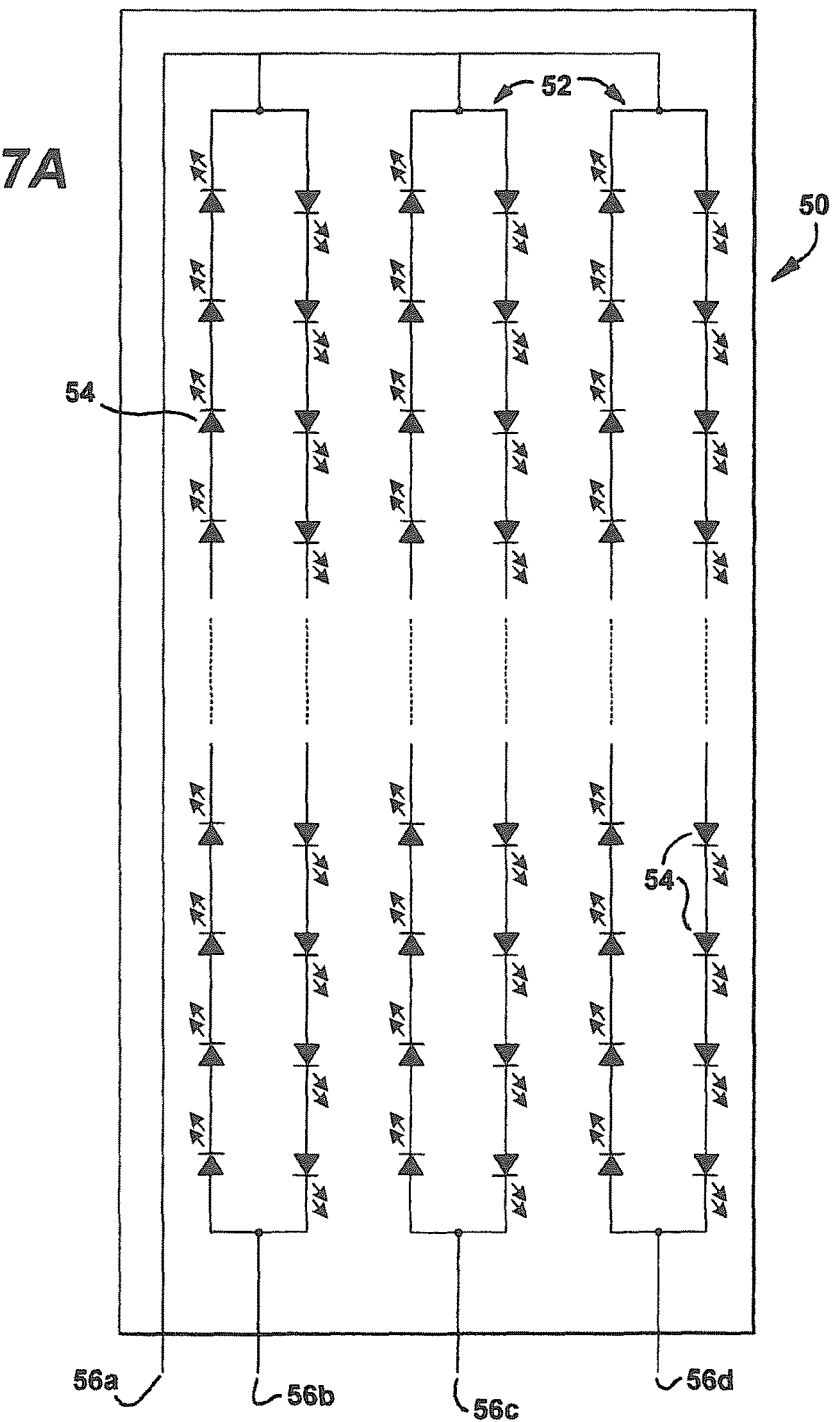
FIG. 7a shows a schematic view of a preferred embodiment of the invention.

FIGS. 6a and 7a disclose schematic diagrams of a multi-voltage and/or multi-brightness LED lighting devices 50. The multi-voltage and/or multi-brightness LED lighting devices 50 comprises at least two AC LED circuits 52, each of which have at least two LEDs 54 in series and anti-parallel relation. The at least two AC LED circuits 52 have at least three electrical contacts 56a, 56b and 56c, and in the case of FIG. 7a a fourth electrical contact 56d. The at least two AC LED circuits 52 are electrically connected together in parallel at one end 56a and left unconnected at the opposing ends of the electrical contacts 56b and 56c, and in the case of FIG. 7a, 56d. One side of an AC voltage source line is electrically connected to 56a and the other side of an AC voltage source line is individually electrically connected to 56b, 56c, and 56d with either a fixed connection or a switched connection thereby providing a first brightness when AC voltage is applied to 56a and 56b and a second brightness when an AC voltage is applied to 56a, 56b and 56c, and a third brightness when an AC voltage is applied to 56a, 56b, 56c, and 56d. It is contemplated that the multi-voltage and/or multi-brightness LED lighting devices 50 are a single chip, an LED package, an LED assembly or an LED lamp.

Figure 7B:
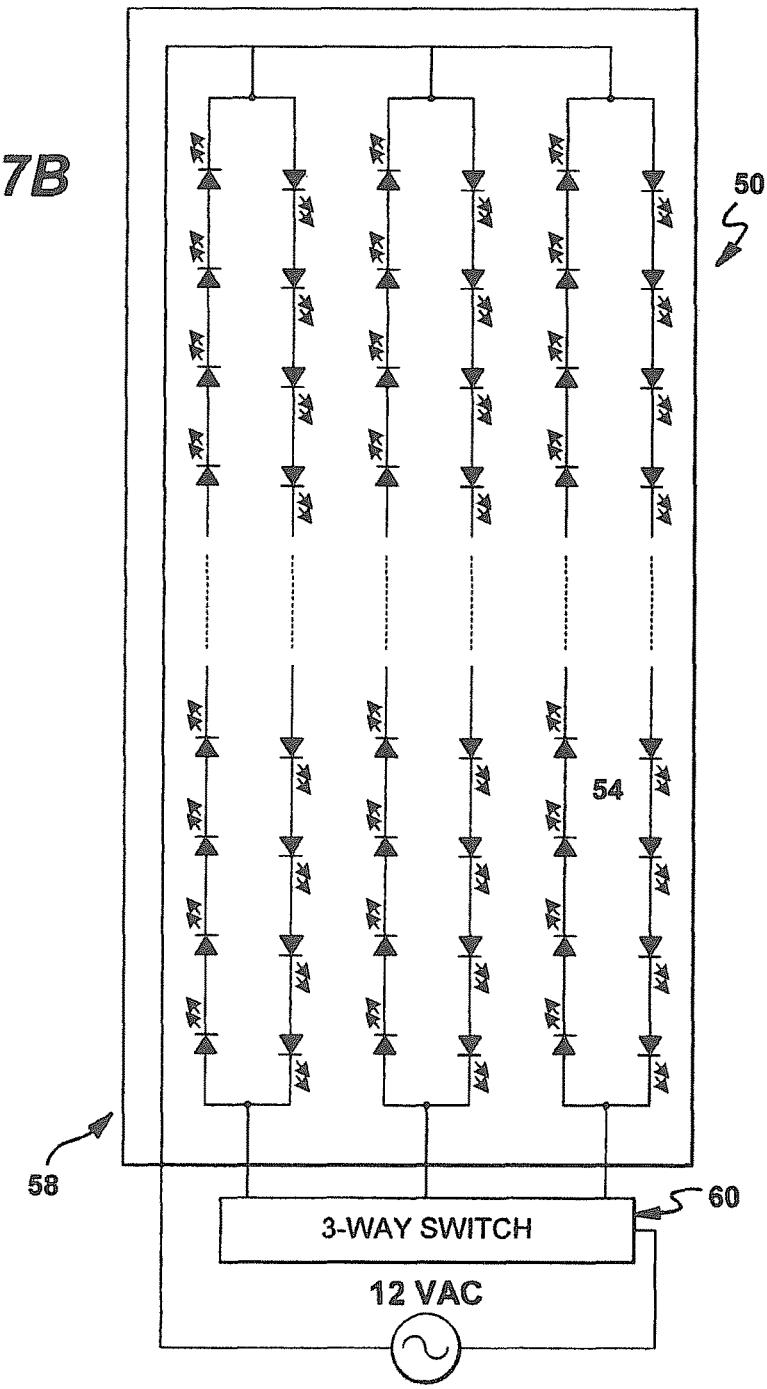
FIG. 7b shows a schematic view of a preferred embodiment of the invention.

FIGS. 6b and 7b disclose a schematic diagram similar to the multi-voltage and/or multi-brightness LED device 50 shown in FIGS. 6a and 7a integrated within a lamp 58 and connected to a switch 60 to control the brightness level of the multi-voltage and/or multi-brightness LED lighting device 50.

Figure 8:
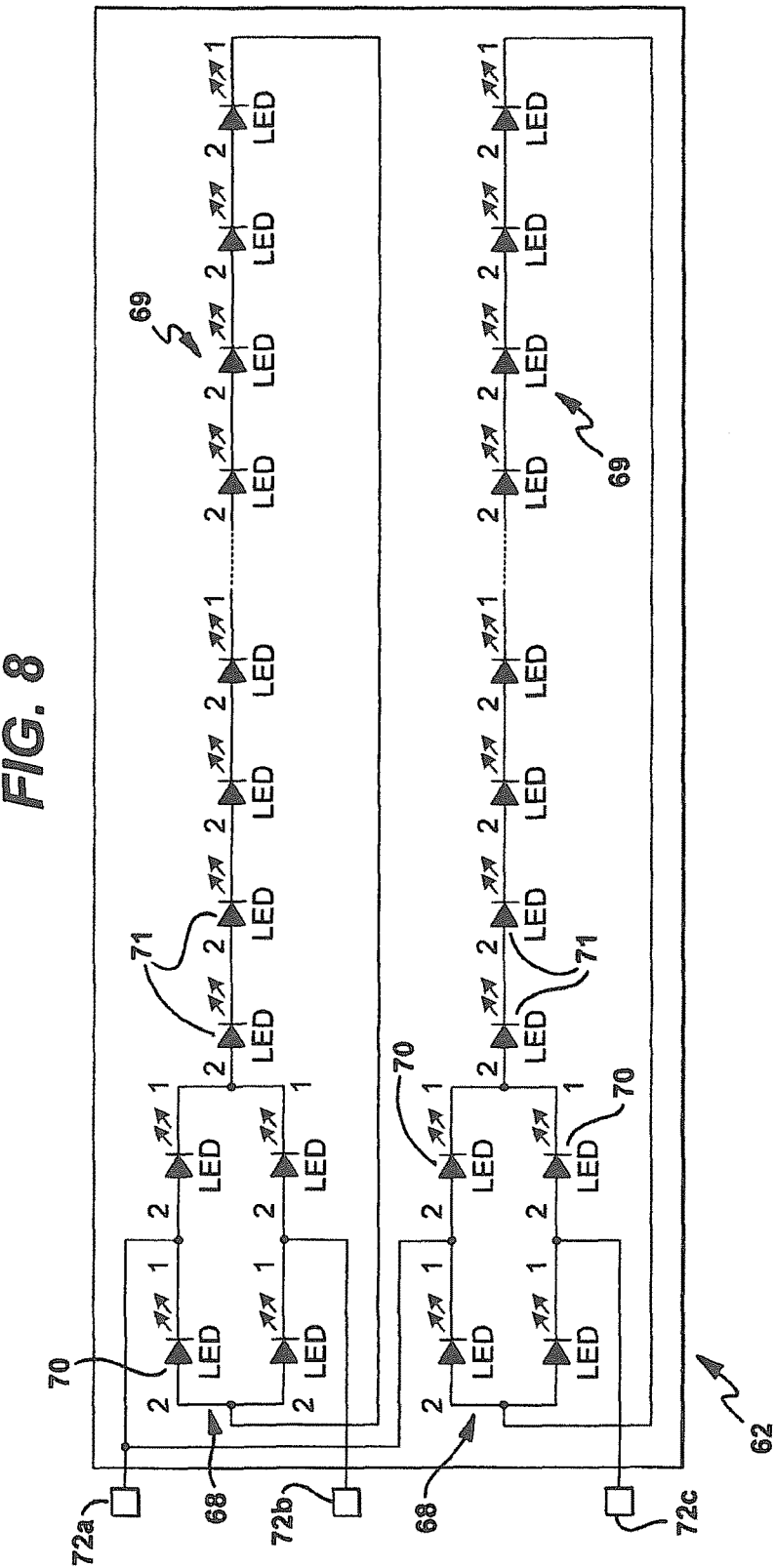
FIG. 8 shows a schematic view of a preferred embodiment of the invention.

FIG. 8 discloses a schematic diagram of a multi-brightness LED lighting device 62 having at least two bridge rectifiers 68 in series with LED circuits 69. Each of the at least two bridge rectifiers 68 in series with LED circuits 69 comprise four LEDs 70 configured in a bridge circuit 68. LED circuits 69 have at least two LEDs 71 connected in series and electrical contacts 72a, 72b and 72c. When one side of an AC voltage is applied to 72a and the other side of an AC voltage line is applied to 72b and 72c individually, the brightness level of the multi-brightness LED lighting device 62 can be increased and/or decreased in a fixed manner or a switching process.

Figure 9:
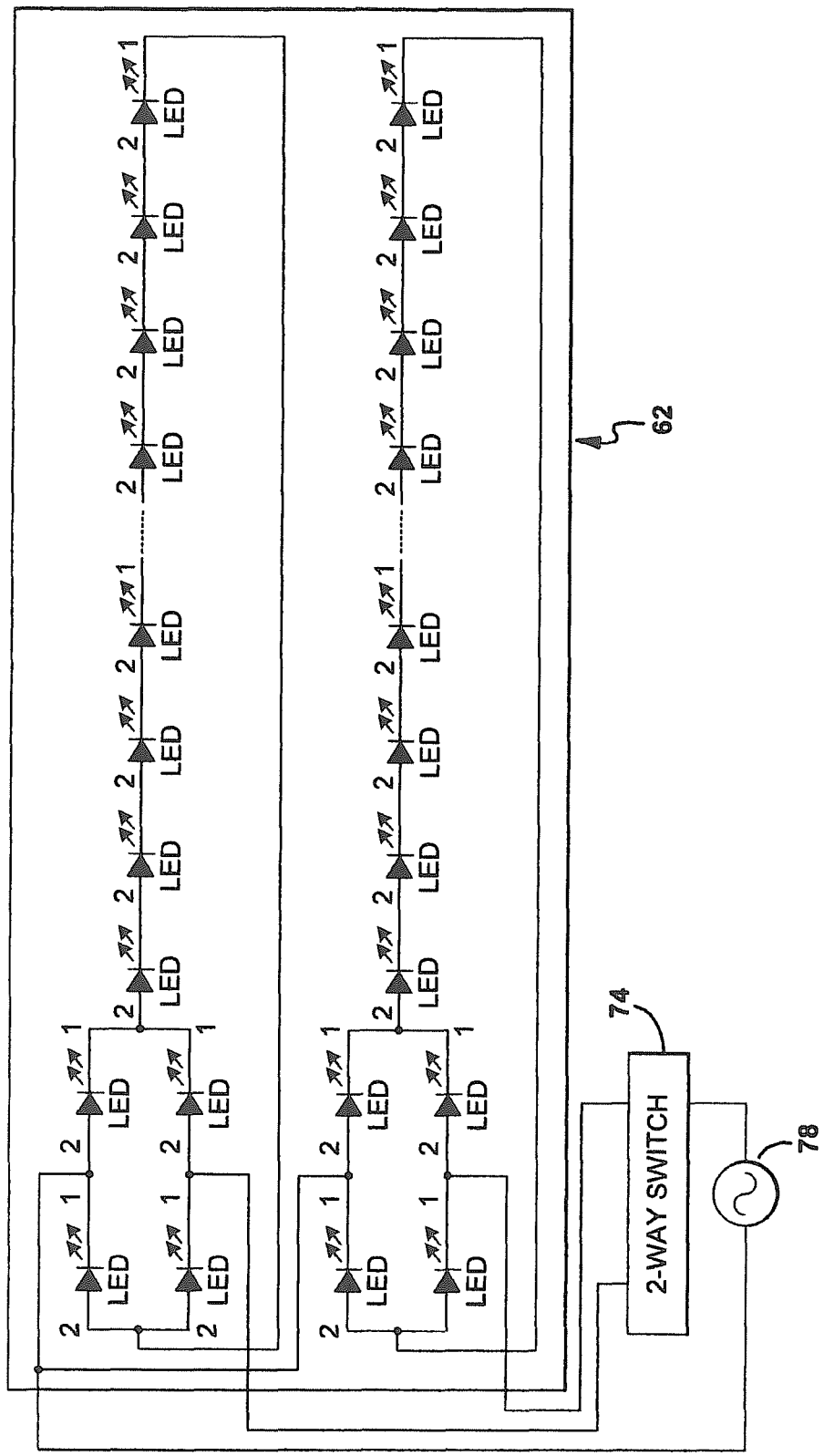
FIG. 9 shows a schematic view of a preferred embodiment of the invention.

FIG. 9 discloses a schematic diagram the multi-brightness LED lighting device 62 as shown above in FIG. 8 with a switch 74 electrically connected between the multi-brightness LED lighting device 62 and the AC voltage source 78.

FIG. 9 discloses a schematic diagram of at least two single voltage LED circuits integrated with a single chip or within a substrate and forming a multi-voltage and/or multi-brightness LED device.

FIG. 10 discloses a schematic diagram of a single chip LED bridge circuit 80 having four LEDs 81 configured into a bridge circuit and monolithically integrated on a substrate 82. The full wave LED bridge circuit has electrical contacts 86 to provide for AC voltage input connectivity and DC voltage output connectivity.

FIG. 11 discloses a schematic diagram of another embodiment of a single chip multi-voltage and/or multi-brightness LED lighting device 90. The multi-voltage and/or multi-brightness LED lighting device 90 has at least two series LED circuits 92 each of which have at least two LEDs 94 connected in series. The at least two series LED circuits 92 have electrical contacts 96 at opposing ends to provide a means of electrical connectivity. The at least two series LED circuits are monolithically integrated into a single chip 98. The electrical contacts 96 are used to wire the at least two series LEDs circuit 92 into a series circuit, a parallel circuit or an AC LED circuit all within a single chip.

FIG. 12 discloses a schematic diagram of the same multi-voltage and/or multi-brightness LED lighting device 90 as shown above in FIG. 11. The multi-voltage and/or multi-brightness LED lighting device 90 has at least two series LED circuits 92 each of which have at least two LEDs 94 connected in series. The at least two series LED circuits can be monolithically integrated within a single chip or discrete individual die can be integrated within a substrate to form an LED package 100. The LED package 100 has electrical contacts 102 that are used to wire the at least two series LEDs circuit into a series circuit, a parallel circuit or in anti-parallel to form an AC LED circuit all within a single LED package.

Figure 13:
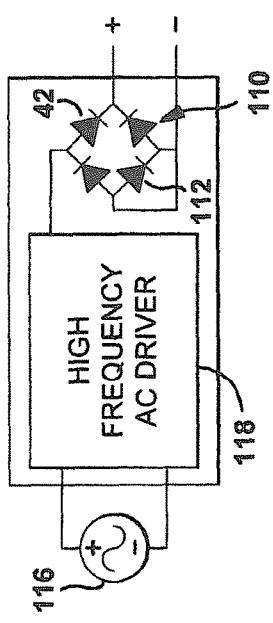
FIG. 13 shows a schematic view of a preferred embodiment of the invention.
Figure 14:
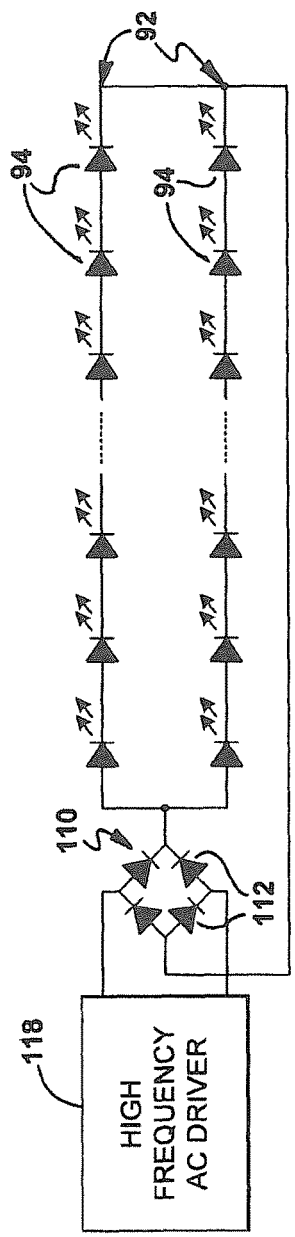
FIG. 14 shows a schematic view of a preferred embodiment of the invention.
Figure 15:
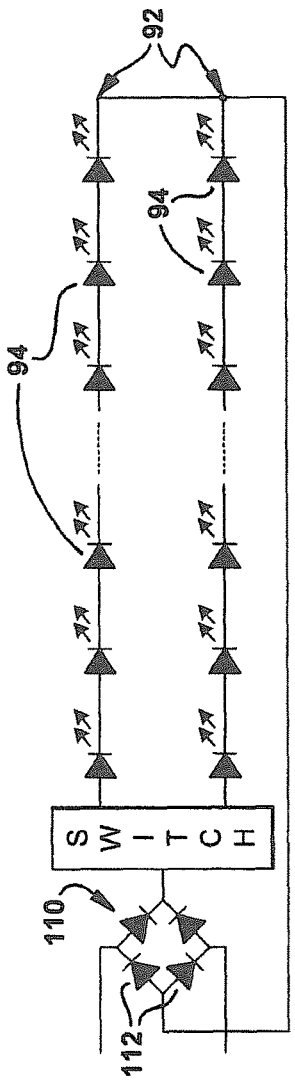
FIG. 15 shows a schematic view of a preferred embodiment of the invention.

As seen in FIGS. 13-15, a single rectifier 110 may be provided for two or more LED circuits 92, each containing at least two LEDs 94 connected in series. The single rectifier 110 comprises standard diodes 112 connected to an AC voltage source 116, or in the alternative may be connected to a driver or power supply which ultimately provides an AC voltage, like for example a high frequency AC driver 118. The single rectifier 110 is electrically connected to the LED circuits 92. Specifically, the rectifier 110 connects to a common junction of an anode of at least one LED 94 in each LED circuit 92, and to the cathode of at least one LED 94 in each LED circuit 92. As shown in FIG. 15, the rectifier may instead be connected to a switch, allowing for either one or both of LED circuits 92 to be operative at any given time.

It is contemplated by the invention that diodes 112 in FIGS. 13-15 are interchangeable with LEDs 70 in rectifiers 68 in FIGS. 8 and 9 and vice versa. As should be appreciated by those having skill in the art, any combination of LEDs 70 and diodes 112 can be used in rectifiers 68 and 110, so long as rectifiers 68 and 110 provide DC power from an AC source.

As shown in FIGS. 13 and 14, and further shown in FIGS. 16-20, any lighting devices, chips, or AC LED or DC LED circuits contemplated by the present invention may be powered through a high-frequency AC driver 118. As shown in FIG. 13, any AC source 116 may be connected to the high-frequency driver or inverter or transformer 118, however, as shown in FIGS. 16-20 it is contemplated that low frequency voltage 124, like for example a mains voltage, is provided to the high-frequency driver or transformer or inverter 118.

Figure 16:
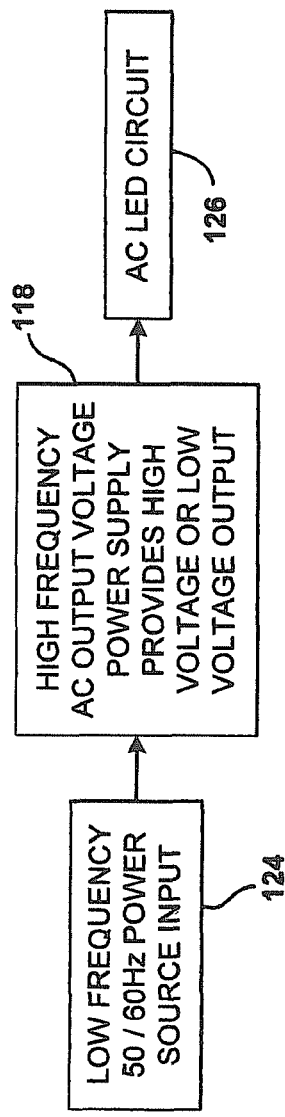
FIG. 16 shows a block diagram of a preferred embodiment of the invention.
Figure 17:
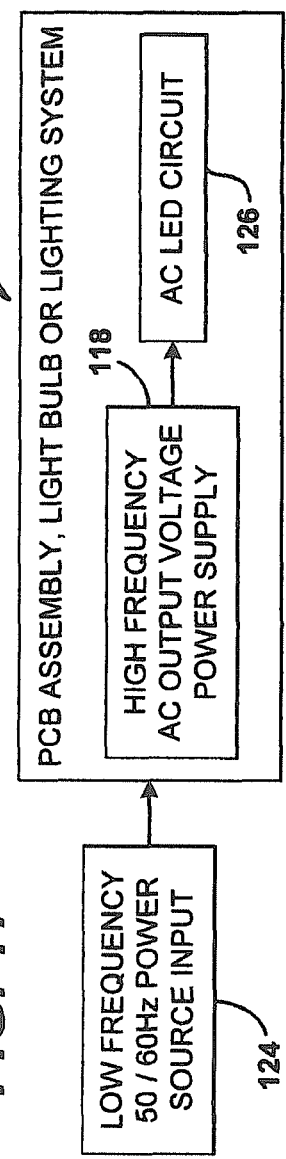
FIG. 17 shows a block diagram of a preferred embodiment of the invention.

FIGS. 16 and 17 show two embodiments of an AC LED lighting system 140 wherein a high-frequency AC driver, inverter, or transformer 118 for provides a high-frequency voltage to an AC LED circuit, lighting device, or chip 126. AC LED circuit, lighting device, or chip 126 may be any of the devices, circuits, or chips shown and described in FIGS. 1-7, like for example LED lighting devices 10, 20, 30 and/or AC LED circuits 12, 32, or any combination thereof. When multiple AC LED circuits, lighting devices, or chips are connected to the high-frequency driver in combination, such AC LED circuit(s), lighting device(s), or chip(s) may be connected together in either a series relationship, a parallel relationship, or a series-parallel relationship.

As shown in FIG. 16, the high-frequency AC driver, inverter or transformer 118 may be packaged separately from an (or multiple) AC LED circuit, device, or chip 126. In such embodiments a power source 128 provides voltage to the high-frequency AC driver, inverter or transformer 118 which steps up the frequency of the voltage to a higher frequency and provides the higher-frequency voltage to the AC LED circuit(s), device(s), or chip(s) 126. High-frequency AC driver, inverter, or transformer 118 may further include necessary circuitry, for example a transformer, for stepping-up or stepping-down the AC voltage provided by the power source 128.

As shown in FIG. 17, high-frequency AC driver 118 may be packaged with AC LED circuit(s), device(s), or chip(s) 126 in a unitary AC LED light bulb, lighting element 130. It is contemplated by the invention that a switch may be configured between the high-frequency driver 118 and the AC LED circuit(s), device(s), or chip(s) 126 for selectively operating one or more AC LED circuit, lighting device, or chip. For example, as shown in FIGS. 6A, 6B, 7A, and 7B a 2-way or 3-way switch may be attached at the input side of the AC LED circuit(s), lighting device(s), or chip(s). Such a switch may be located between the high-frequency AC driver, inverter, or transformer 118, and the AC LED circuit(s), lighting device(s), or chip(s).

FIGS. 14 and 18-20 show a DC LED lighting system 142 having a DC LED circuit(s), device(s), or chip(s) 92, 132 being powered by a high-frequency AC driver, inverter, or transformer 118 through a rectifier 110. In operation, the combination of AC sources 116, 128, high-frequency AC driver, inverter or transformer 118, and DC LED circuit, device, or chip 92, 132 operate in substantially the same manner as that described with respect to FIGS. 16 and 17. However, in each system shown in FIGS. 14 and 18-20, rectifier 110 rectifies the high-frequency AC voltage output of the high-frequency AC driver before a voltage is provided to the DC LED circuit(s), device(s), or chip(s) 92, 132. DC LED circuit(s), device(s), or chip(s) 132 are not limited in form to just circuit 92, and instead may take the form of any of the lighting devices, circuits, or chips shown and described, for example, in FIGS. 8-12. When multiple DC LED circuits, lighting devices, or chips are connected to the high-frequency driver in combination, such DC LED circuit(s), lighting device(s), or chip(s) may be connected together in either a series relationship, a parallel relationship, or a series-parallel relationship. Additionally, as shown in FIG. 15, a switch, like for example a 2-way switch or a 3-way switch, may also be attached at the input side of DC LED circuit(s), device(s), or chip(s).

Figure 18:
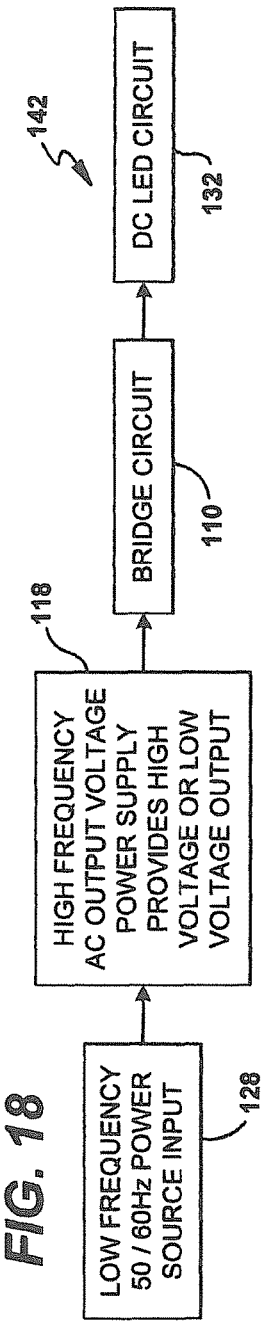
FIG. 18 shows a block diagram of a preferred embodiment of the invention.
Figure 19:
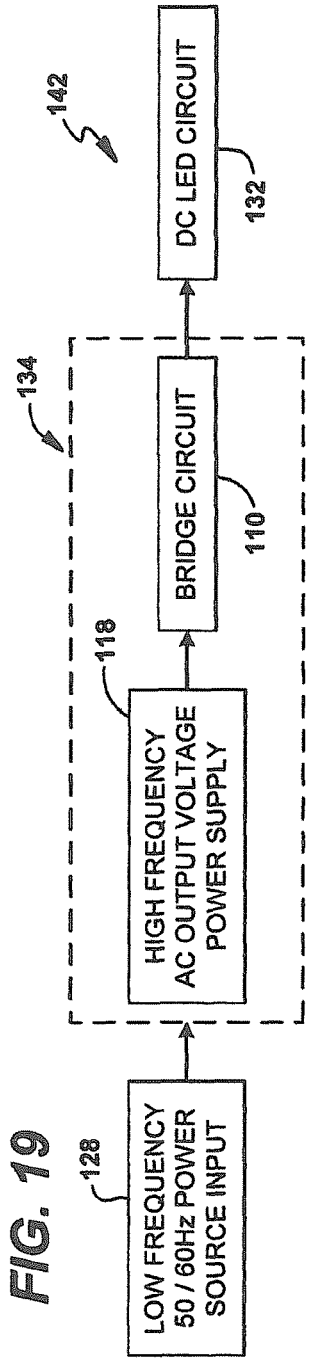
FIG. 19 shows a block diagram of a preferred embodiment of the invention.
Figure 20:
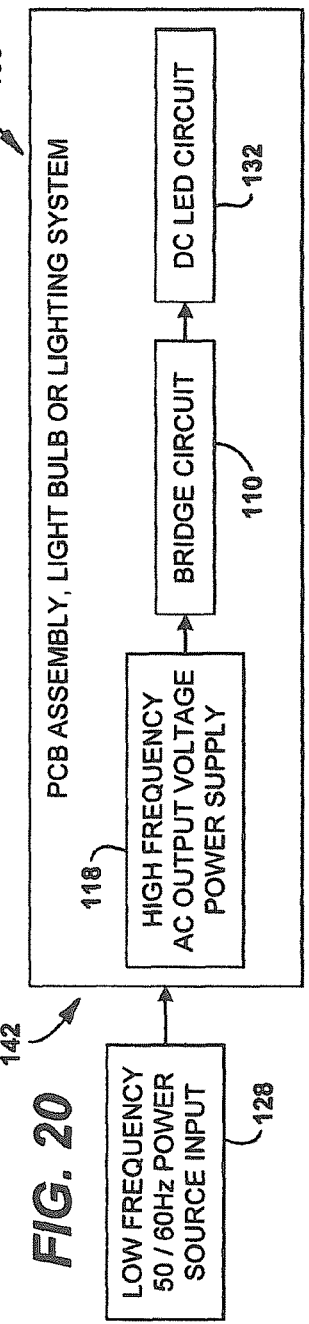
FIG. 20 shows a block diagram of a preferred embodiment of the invention.

As shown in FIGS. 18-20, like in an AC embodiment, AC driver 118, rectifier 110, and DC LED circuit(s), device(s), or chip(s) 132 may be packaged in any number of ways. As shown in FIG. 18, each element may be packaged separately and electrically connected together in series. Alternatively, as shown in FIG. 19, a DC LED driver 134 may be formed by combining the high-frequency AC driver 118 with rectifier 110. As shown in FIG. 20, an additional alternative contemplated by the invention is forming a DC LED lighting element 136, which may be embodied as a light bulb, lighting system, lamp, etc., wherein the DC LED lighting element 136 includes each of a high-frequency AC driver 118, a rectifier 110, and a DC LED circuit(s), lighting device(s), or chip(s) 132. It should be appreciated by those having skill in the art that a lighting element containing only rectifier 110 and a DC LED circuit(s), lighting device(s), or chip(s) 132 may also be designed. Such lighting elements have the advantage of being able to be plugged into any AC source, whether it is a high-frequency AC driver, inverter, or transformer, or a simple mains voltage, and provide a light output in the same manner as the imbalanced circuit shown in, for example FIGS. 1-7.

Figure 21:
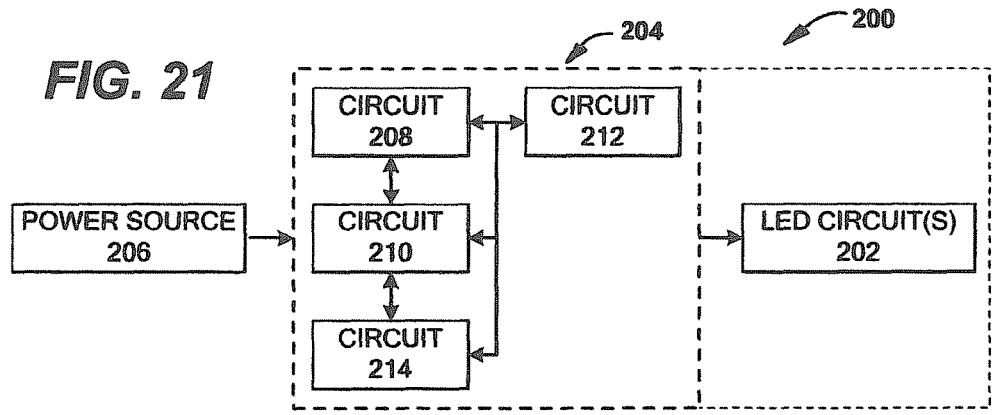
FIG. 21 shows a block diagram of an embodiment of an LED system as contemplated by the invention.
Figure 22:
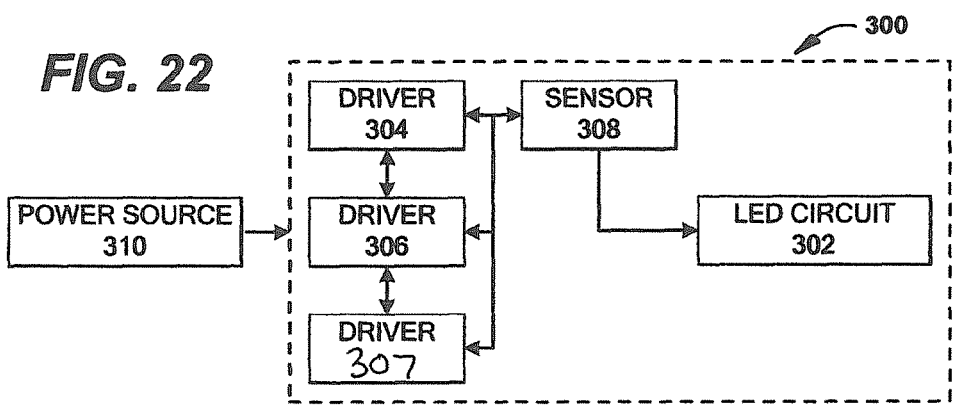
FIG. 22 shows a block diagram of an embodiment of an LED system as contemplated by the invention.

FIGS. 21 and 22 show embodiments of a lighting system which may be used to incorporate any of the AC LED or DC LED drivers, lighting devices, circuits, chips or the like discussed herein.

FIG. 21 shows lighting system 200 having at least one LED circuit 202 connected as a load to driver 204. LED circuit 202 has at least two LEDs connected in series and may be configured in any manner shown and discussed in any of figures, like for example, FIGS. 1-9, 11, and 12, or as shown and discussed later in FIG. 24. As should be appreciated by those having ordinary skill in the art, it is contemplated that lighting system 200 may include two or more LED circuits 202 connected in series, parallel, or series parallel wherein each LED circuit 202 has at least two LEDs connected in series.

Driver 204 in lighting system 200 has an input, like for example a plug, power cord, or other adapter capable of connecting to a power source, for receiving a first AC voltage and frequency from power source 206, which may be any AC power source including a mains power source, and includes at least first circuit 208 and second circuit 210 which are each capable of receiving the first AC voltage and first frequency. Circuits 208, 210 each have an output capable of being connected the at least one LED circuit 202 for driving the at least two LEDs connected therein. As seen in FIG. 21, driver 204 may additionally include circuit 214 which is substantially similar to circuits 208, 210. As should be appreciated by those having ordinary skill in the art, any number of circuits may be included in driver 204 so long as each additional circuit is capable of receiving the first AC voltage and first frequency, and having an output capable of being connected the at least one LED circuit 202 for driving the at least two LEDs connected therein.

Driver 204 further includes a sensor in the form of circuit 212 which is configured to sense and permit the output of only one of first circuit 208 or second circuit 210 to be provided to the at least one LED circuit 202. For example, circuit 212 may be configured to sense the output from both first circuit 208 and second circuit 210 and allow only the output of first circuit 208 to be provided to at least one LED circuit 202 while the output of circuit 210 is blocked or not provided to at least one LED circuit 202. If circuit 212 no longer senses an output from circuit 208, because for example circuit 208 has failed, circuit 212 may disconnect or block the output of circuit 208 from at least one LED circuit 202, and connect the output of circuit 210 to at least one LED circuit 202 so that circuit 210 drives at least one LED circuit 202. As should be appreciated by those having ordinary skill in the art, in embodiments including circuit 214 or any additional circuits capable of receiving the first AC voltage and first frequency and having an output capable driving at least one LED circuit 202, circuit 212 may be configured to allow only a single output through and connect a new circuit output each time the circuit providing an output to at least one LED circuit 202 fails.

In order to achieve this function, circuit 212 may include any sensor and/or switch combination known to those of ordinary skill in the art capable of detecting or sensing the output of circuits 208 and 210, and blocking the outputs so only a single output is provided to at least one LED circuit 202 at all times so long as one of circuit 208 and 210 are operational. Examples of circuits which may be used as circuit 212 include a relay circuit, a micro-controller IC, or a voltage level sensing circuit connected between the output of circuits 208 and 210 and at least one LED circuit 202.

In alternative embodiments, circuit 212 may include a logic gate and multiple circuits, each of the multiple circuits including an RMS converter and a window voltage comparator controlling an analog switch. Each RMS converter would receive the output of circuit 208 or circuit 210 and convert the output voltages to an RMS voltage. The RMS voltage may then be provided to a respective window voltage comparator, and be compared to high and low reference voltages stored in the each window voltage comparator. If the measured RMS voltage is within the high or low reference range, the comparator may then close an analog switch, allowing the output of circuit 208 or 210 to proceed to the logic gate. The logic gate may then be configured to allow only one received output from circuit 208 or 210 to pass through and be provided to at least one LED circuit 202. If the allowed output from either of circuit 208 or 210 fails and is not provided, the logic gate may then allow the non-allowed output from 208 or 210 to be provided to at least one LED circuit 202. Utilizing a logic gate receiving multiple inputs and an RMS converter and window voltage comparator has the added benefit of blocking the output from either of circuit 208 or 210 if the output is too high or too low, insuring maximum efficiency when driving at least one LED circuit 202.

Regardless of what is used for circuit 212, it should be appreciated by those having ordinary skill in the art that a two-way or three-way switch like that shown and described in FIGS. 6A and 6B or 7A and 7B may be provided on the back end of circuit 212 wherein the two-way or three-way switch may connect additional LED circuits formed as part of at least one LED circuit 202. Utilizing a switch may allow for additional LED circuits to be turned on and off, adjusting the brightness of system 200.

As should be appreciated by those having ordinary skill in the art, any two-way or three-way switch may also be utilized to join the output of circuits 208 and 210, as well as any additional similar circuits included in driver 204, to provide additional power to at least one LED circuit 202. For example, the switch may be used to combine the outputs of circuits 208 and 210 into a single output before reaching circuit 212, or alternatively may alter the logic of a logic gate used in circuit 212, allowing the output of both circuits 208 and 210 to be provided to at least one LED circuit 202.

FIG. 22 shows an alternative embodiment to FIG. 21 wherein lighting system 300 contains at least one LED circuit 302, which is substantially similar to LED circuit 202, drivers 304 and 306 and sensor 308. In operation, drivers 304 and 306 function in a similar manner as circuits 208 and 210 and sensor 308 may function in substantially the same manner as circuit 212. In the embodiment shown in FIG. 22, however, drivers 304 and 306 may be packaged separately from sensor 308. Packaging each driver 304 and 306 separately may also allow for either driver to be easily replaced within system 300 if either driver 304 or 306 fails.

Drivers 304 and 306 each have a first input for receiving a first AC voltage and frequency and each contain an output capable of being connected to the at least one LED circuit 302 through sensor 308. In embodiments where multiple drivers are used, lighting system 300 may include a single input for power from power source 310, like for example a plug, power cord, or other adapter capable of connecting to and transmitting an AC voltage.

As with the embodiment described in FIG. 21, in embodiments where multiple drivers are used, sensor 308 may be configured to receive the output of the drivers 304 and 306, sense the voltages, and allow only a single output to be provided to at least one LED circuit 302. Sensor 308 may include a relay circuit, a micro-controller IC, or a voltage level sensing circuit connected between the output of circuits 208 and 210 and at least one LED circuit 202.

In alternative embodiments, sensor 308 may include a logic gate and multiple circuits, each of the multiple circuits including an RMS converter and a window voltage comparator controlling an analog switch. Each RMS converter would receive the output of driver 304 or driver 306 and convert the output voltages to an RMS voltage. The RMS voltage may then be provided to a respective window voltage comparator, and be compared to high and low reference voltages stored in the each window voltage comparator. If the measured RMS voltage is within the high or low range, the comparator may then close an analog switch, allowing the output of driver 304 or 306 to proceed to the logic gate. The logic gate may then be configured to allow only one received output from drivers 304 or 306 to pass through and be provided to at least one LED circuit 302. If the allowed output from either of driver 304 or 306 fails and is not provided, the logic gate may then allow the non-allowed output from drivers 304 or 306 to be provided to at least one LED circuit 302. Utilizing a logic gate receiving multiple inputs and an RMS converter and window voltage comparator has the added benefit of blocking the output from either of drivers 304 and 306 if the output is too high or too low, insuring maximum efficiency when driving at least one LED circuit 302.

Figure 23:
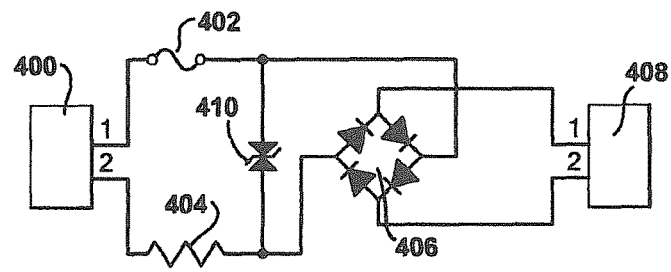
FIG. 23 shows a schematic diagram of a circuit or driver as contemplated by the invention.

While circuits 208, 210 and drivers 304, 306 may be any of the drivers or circuits discussed herein capable of driving LED circuits, FIG. 23 shows one embodiment of circuits 208, 210 and a configuration for drivers 304, 306 as contemplated by the invention. As should be appreciated by those having ordinary skill in the art, each of the circuit shown in FIG. 23 may be packaged separately forming drivers 304, 306, or packaged together in a single driver forming driver 204. As such, it should be understood when referring to FIG. 23, the terms circuits 208, 210 may be used interchangeably with the terms driver 304, 306.

As seen in FIG. 23, circuits 208, 210 each contain AC input 400, connected in series with fuse 402, resistor 404, and bridge rectifier 406 which provides DC output 408 from circuits 208, 210 to a sensor or circuit and at least one LED circuit. Circuits 208, 210 may also include a voltage suppressor 410 connected in series with fuse 402 and resistor 404, while being connected in parallel with rectifier 406. Voltage suppressor 410 may be a transient voltage suppressor used to protect rectifier 406 and any sensor or circuit or LED circuits connected to the output of the circuit 208 or 210. Circuits 208, 210 and drivers 304, 306 may further include a transformer for stepping the provided AC voltage up or down and/or to adjust the provided AC frequency up or down.

Driver 204 may further include further include at least two capacitors connected to a fourth circuit wherein the fourth circuit only allows one of the at least two capacitors to connect to the first or second circuit or any additional circuits included in driver 204 which are providing an output to LED circuit 202. The fourth circuit may be configured to disconnect the one of the at least two capacitors connected to the first or second circuit if the one capacitor fails and then connect at least one other capacitor from the at least two capacitors to circuits 208, 210. The fourth circuit may be configured to connect any one of the at least two capacitors anywhere within the first or second circuit, and preferably in parallel with bridge rectifier 406.

In embodiments like that shown in FIG. 22 wherein multiple drivers are provided for lighting system 300, each driver 304, 306, 307 may contain at least two capacitors and an internal sensor wherein the internal sensor only one of the at least two capacitors to form a portion of the driver, i.e. form a portion of the circuit shown in FIG. 23.

Figure 24:
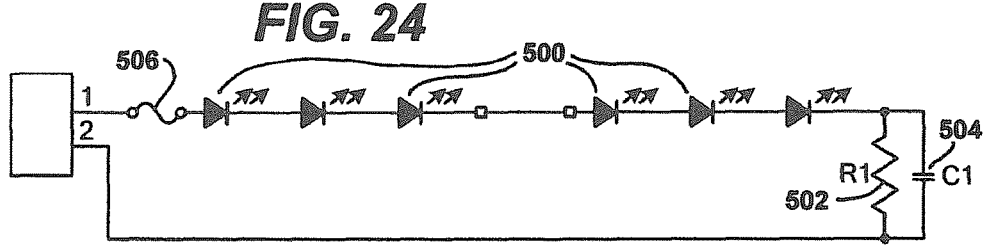
FIG. 24 shows a schematic diagram of an LED circuit as contemplated by the invention.

A resistor may be connected in series with the at least two LEDs forming at least one LED circuit 202, 302 in order to suppress the current provided by driver 204 or drivers 304, 306 to further protect the at least two LEDs. FIG. 24 shows an embodiment of at least one LED circuit 202, 302 for use in conjunction with circuits 208, 210 and drivers 304, 306 shown in FIG. 23, wherein at least two LEDs 500 are connected in series with resistor 502. As seen in FIG. 24, LED circuit 202, 302 may further include a capacitor 504 connected in series with LEDs 502 and in parallel with resistor 502 for smoothing the received output from driver 204 or drivers 304, 306. LED circuit 202, 302 finally may also include a fuse 506 to further protect LED circuit 202, 302 from any surge currents.

In embodiments where mains power is directly rectified and provided to LED circuit 202, 302 through circuit 212 or sensor 308, LEDs 500 may be high voltage LEDs having a forward voltage of at least 36V. However, it should be appreciated that LEDs having any forward voltage may be utilized, so long as the total forward voltage across each LED is satisfied by the provided output from driver 204 or drivers 304, 306.

It is to be understood that additional embodiments of the invention described herein may be contemplated by one of ordinary skill in the art, and the scope of the present invention is not limited to the embodiments disclosed. While specific embodiment s of the present invention have been illustrated described, numerous modifications come to mind without significantly departing from the spirit of the invention, and the scope of protection is only limited by the scope of the accompanying claims.

What is claimed is:

1. A LED lighting system comprising:
   at least one a first LED circuit and a second LED circuit, each circuit comprising at least two LEDs connected in series;
   a first driver circuit having an input for receiving a first AC voltage and frequency from an AC power source, the first driver having a first driver output and connected to the first LED circuit;
   a second driver circuit having an input for receiving the first AC voltage and frequency from the AC power source, the second driver having a second driver output and connected to the second LED circuit; and,
   a controller for controlling the first driver circuit output and the second driver circuit output to the at least first and second LED circuits, the controller being configured to selectively provide the first driver output or the second driver output to the first and second LED circuits.

2. The LED lighting system of claim 1 wherein the controller is configured to sense and provide the first driver output to at least the first LED circuit.

3. The LED lighting system of claim 1 wherein the controller is configured to provide the second driver output to at least the second LED circuit if the first driver output is not sensed by the controller.

4. The LED Lighting System of claim 1 wherein the at least first and second LED circuits are made with multi-voltage LED packages.

* * * * *